United States Patent
Song

(10) Patent No.: US 10,388,980 B2
(45) Date of Patent: Aug. 20, 2019

(54) CAP ASSEMBLY

(71) Applicant: LG CHEM, LTD., Seoul (KR)

(72) Inventor: Han Gab Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 23 days.

(21) Appl. No.: 15/556,560

(22) PCT Filed: Aug. 22, 2016

(86) PCT No.: PCT/KR2016/009252
§ 371 (c)(1),
(2) Date: Sep. 7, 2017

(87) PCT Pub. No.: WO2017/034266
PCT Pub. Date: Mar. 2, 2017

(65) Prior Publication Data
US 2018/0053961 A1    Feb. 22, 2018

(30) Foreign Application Priority Data

Aug. 21, 2015   (KR) .................. 10-2015-0118022

(51) Int. Cl.
*H01M 10/04* (2006.01)
*H01M 2/04* (2006.01)
(Continued)

(52) U.S. Cl.
CPC ............ *H01M 10/04* (2013.01); *H01M 2/04* (2013.01); *H01M 2/12* (2013.01); *H01M 2/1282* (2013.01);
(Continued)

(58) Field of Classification Search
CPC .... H01M 2200/10; H01M 10/04; H01M 2/04; H01M 2/12; H01M 2/1282;
(Continued)

(56) References Cited

U.S. PATENT DOCUMENTS 5,766,790 A     6/1998   Kameishi et al.
5,766,793 A *   6/1998   Kameishi ............... H01M 2/34
                                                      429/56
(Continued)

FOREIGN PATENT DOCUMENTS

JP    9-129214 A    5/1997
JP    H-11-86822 A  3/1999
(Continued)

OTHER PUBLICATIONS

International Search Report for PCT/KR2016/009252 (PCT/ISA/210) dated Nov. 28, 2016.
(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

The present invention provides a cap assembly mounted on an opening of a can, the cap assembly comprising: a top cap; a safety element disposed on a lower portion of the top cap; a safety vent disposed on a lower portion of the safety element and having a cut part; a down cap disposed on a lower portion of the safety vent; a gasket surrounding edges of the top cap, the safety element, the safety vent, and the down cap and mounted on the opening of the can; and a lifting guide part disposed between the safety vent and the down cap to lift the safety vent while being expanded by a high-temperature gas transferred from the inside of the can and thereby to cut the cut part so that the high-temperature gas is released to the outside.

6 Claims, 4 Drawing Sheets

(51) Int. Cl.
*H01M 2/12* (2006.01)
*H01M 2/34* (2006.01)

(52) U.S. Cl.
CPC ............ *H01M 2/1294* (2013.01); *H01M 2/34* (2013.01); *H01M 2200/10* (2013.01)

(58) Field of Classification Search
CPC .. H01M 2/1294; H01M 2/34; H01M 10/0422; H01M 2/046; H01M 2/1247; H01M 2/1252; Y02E 60/12
See application file for complete search history.

(56) References Cited

U.S. PATENT DOCUMENTS

| | | |
|---|---|---|
| 2006/0073375 A1 | 4/2006 | Hong et al. |
| 2006/0078787 A1 | 4/2006 | Sato et al. |
| 2006/0263676 A1 | 11/2006 | Chang et al. |
| 2008/0131769 A1 | 6/2008 | Sato et al. |
| 2009/0130544 A1 | 5/2009 | Chang et al. |
| 2011/0111285 A1 | 5/2011 | Hirakawa |

FOREIGN PATENT DOCUMENTS

| | | |
|---|---|---|
| JP | 2000/277063 A | 10/2000 |
| JP | 2003-288876 A | 10/2003 |
| JP | 2003288876 A * | 10/2003 |
| JP | 2004-319465 A | 11/2004 |
| KR | 20-1998-0045826 U | 9/1998 |
| KR | 10-0496302 B1 | 6/2005 |
| KR | 10-2006-0104333 A | 10/2006 |
| KR | 10-0958649 B1 | 5/2010 |
| WO | WO 2010/125755 A1 | 11/2010 |

OTHER PUBLICATIONS

Extended European Search Report for European Application No. 16839555.6, dated Mar. 16, 2018.

* cited by examiner

CAP ASSEMBLY

CROSS-REFERENCE TO RELATED APPLICATION

The present application claims the benefit of the priority of Korean Patent Application No. 10-2015-0118022, filed on Aug. 21, 2015, which is hereby incorporated by reference in its entirety.

TECHNICAL FIELD

The present invention relates to a cap assembly, and more particularly, to a cap assembly that facilitates gas release.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises an electrode assembly, an electrolyte, a can accommodating the electrode assembly and the electrolyte, and a cap assembly mounted on an opening of the can.

Here, in the secondary battery according to the related art, when a gas pressure within the can increases, a gas is released to the outside through a safety vent of the cap assembly. However, when only a temperature increases in a state in which the gas pressure within the can is low, the safety vent is not opened to cause an accident such as explosion.

The present invention has been made to solve the above-mentioned problem, and an object of the present invention is to provide a cap assembly in which a safety vent is opened to release high-temperature heat together with a gas within a can to the outside although a temperature within the can increases to previously prevent an accident from occurring.

Technical Solution

A can assembly mounted on an opening of a can according to the present invention may comprise: a top cap; a safety element disposed on a lower portion of the top cap; a safety vent disposed on a lower portion of the safety element and having a cut part; a down cap disposed on a lower portion of the safety vent; a gasket surrounding edges of the top cap, the safety element, the safety vent, and the down cap and mounted on the opening of the can; and a lifting guide part disposed between the safety vent and the down cap to lift the safety vent while being expanded by a high-temperature gas transferred from the inside of the can and thereby to cut the cut part so that the high-temperature gas is released to the outside.

The safety vent may comprise a vent coupling part coupled to a gasket and a vent lifting part supported by the lifting guide part, and the vent coupling part and the vent lifting part may be separated from each other when the cut part is cut.

The lifting guide part may be made of a shape-memory alloy material that is restored in a circular shape after being expanded according to a temperature.

At least two lifting guide parts may be provided between the safety vent and the down cap to cut at least two spots of the cut part provided in the safety vent.

Both ends of the lifting part are bonded to the safety vent and the down cap, respectively.

Advantageous Effects

The present invention has effects as follows.

First: the cap assembly may be provided with a lifting guide part to open the safety vent of the cap assembly and thereby to quickly release the gas or the high-temperature heat even though the gas pressure within the can increases, or the high-temperature heat is generated in the can, thereby preventing the safety accident from occurring.

Second: the lifting guide part may be made of the shape-memory alloy material to lift the safety vent while being expanded by the high-temperature heat, thereby easily opening the cut part provided in the safety vent.

Third: at least two lifting guide parts may be provided to more quickly open at least two portions of the safety vent, thereby more quickly releasing the gas or the heat.

MODE FOR CARRYING OUT THE INVENTION

Figure 1:
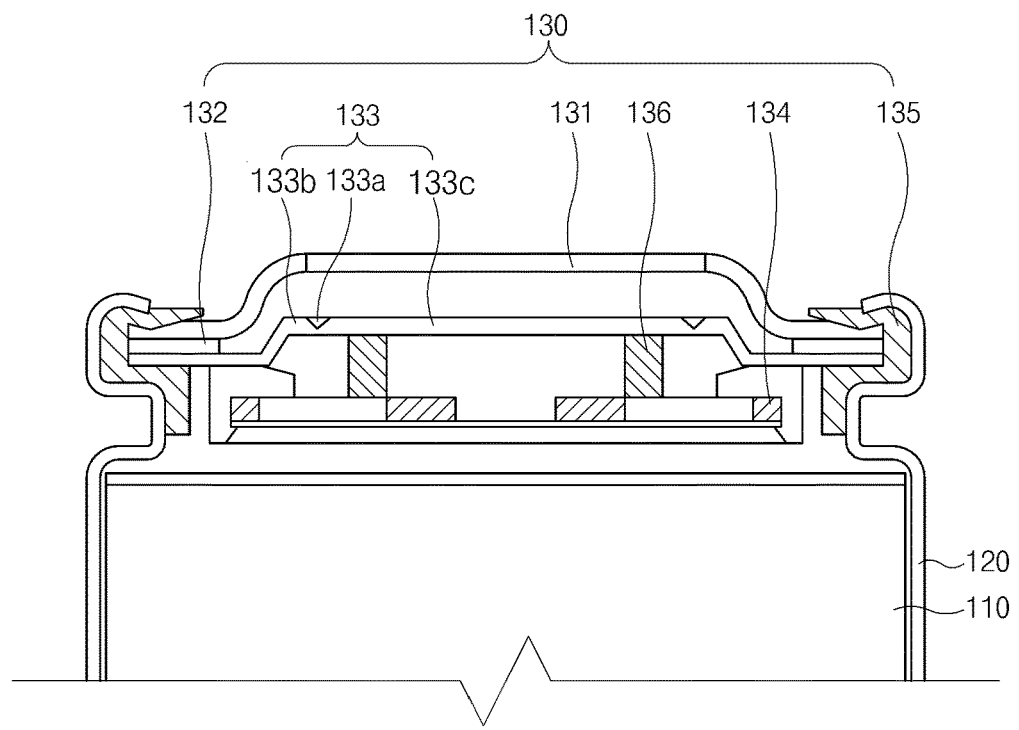
FIG. 1 is a cross-sectional view of a secondary battery provide with a cap assembly according to the present invention.

Hereinafter, an embodiment of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a secondary battery according to the present invention comprises an electrode assembly 110, an electrolyte (not shown), a can 120 into which the electrode assembly 110 and the electrolyte are accommodated through an opening 121 thereof, and a cap assembly 130 mounted on the opening 121 of the can 120.

Here, the cap assembly 130 is mounted on the opening 121 of the can 120 to seal the can 120. The cap assembly 130 comprises a top cap 131 disposed on an upper portion of the opening 121 of the can 120, a safety element 132 disposed on a lower portion of the top cap 131, a safety vent 133 disposed on a lower portion of the safety element 132 and having a cut part 133a, a down cap 134 disposed on a lower portion of the safety vent 133, and a gasket 135 surrounding edges of the top cap 131, the safety element 132, the safety vent 133 and the down cap 134 and mounted on the opening 121 of the can 120.

The cut part 133a is provided as a cut groove so as to be stably cut.

Here, when the secondary battery according to the present invention is charged or discharged, a high-temperature gas is generated by the electrode assembly and the electrolyte. As a result, a pressure within the can 120 increases. Here, if the pressure within the can 120 increases to a predetermined pressure or more, the safety vent 133 is pressurized to cut the cut part 133a, thereby releasing the gas within the can 120 to the outside.

However, if only a temperature of the gas increases without the pressure within the can 120 does not increase to the predetermined pressure or more, the cut part 133a of the safety vent 133 may not be cut to cause an accident such as explosion of the secondary battery.

To solve the abovementioned problem, the secondary battery according to the present invention comprises a lifting guide part 136 that is expanded and contracted according to a temperature so that the cut part 133a of the safety vent 133 is cut even when the temperature of the gas as well as the pressure of the gas increases.

Figure 2:
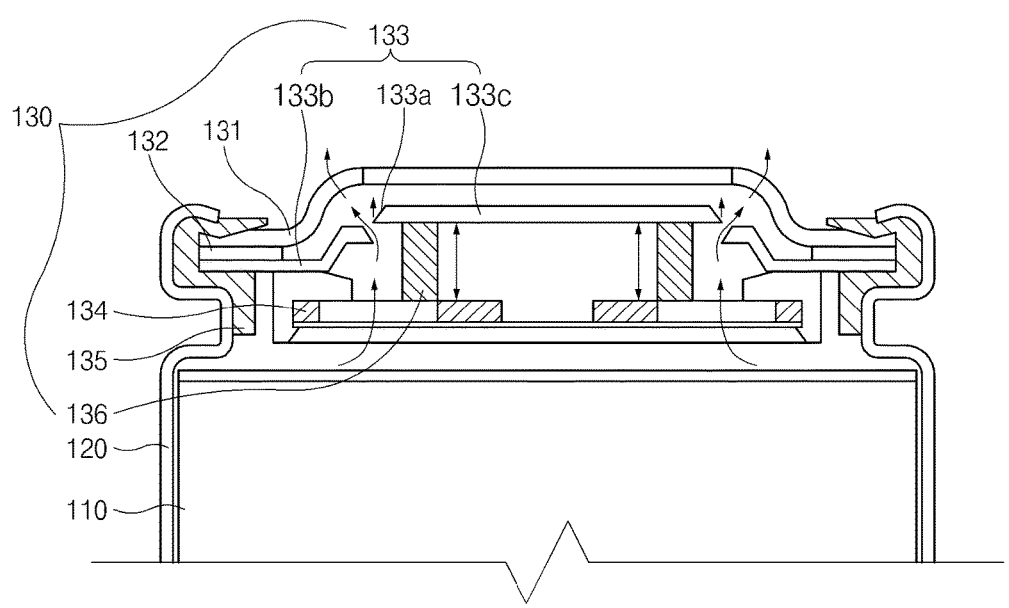
FIG. 2 is a cross-sectional view illustrating an operation state of the secondary battery provided with the cap assembly according to the present invention.

As illustrated in FIG. 2, the lifting guide part 136 is made of a material that is expanded at a high temperature and disposed between the safety vent 133 and the down cap 134. That is, the lifting guide part 136 lifts the safety vent 133 while being expanded by the high-temperature gas transferred relatively weak portion is cut to release the gas within the can 120 to the outside.

In more detail, the lifting guide part 136 pressurizes the safety vent 133 and the down cap 134 in a direction, in which the safety vent 133 and the down cap 134 are split from each other, while being expanded by the high-temperature heat. Here, the cut part 133a having weak strength of the safety vent 133 is cut to release the gas within the can 120 through a hole generated by the cut part 133a to the outside.

Thus, the secondary battery according to the present invention may be opened by the high-temperature heat as well as the gas pressure within the can to improve safety.

Figure 3:
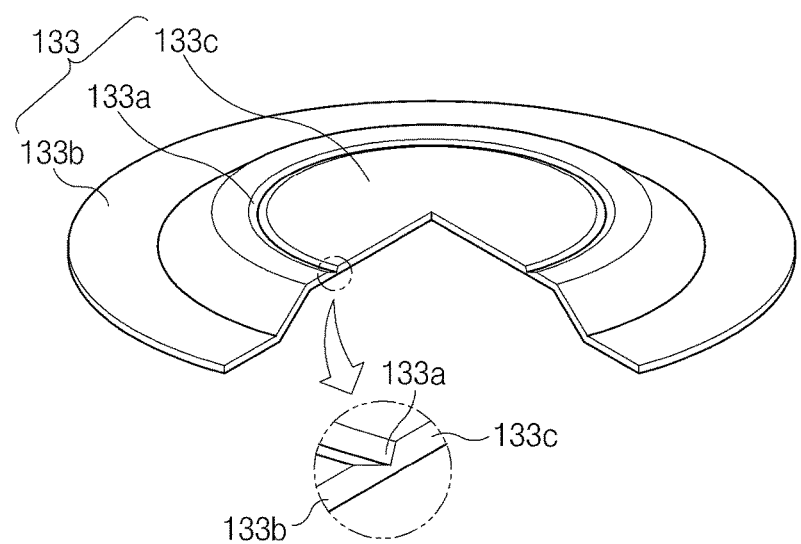
FIG. 3 is a perspective view of a safety vent according to the present invention.

As illustrated in FIG. 3, the safety vent 133 comprises a vent coupling part 133b coupled to the gasket 135 and a vent lifting part 133c supported by the lifting guide part 136, and the cut part 133a is disposed between the vent coupling part 133b and the vent lifting part 133c. That is, when the cut part 133a is cut, the vent coupling part 133b and the vent lifting part 133c may be separated from each other to more quickly release a large amount of gas and high-temperature to the outside.

The lifting guide part 136 is made of a shape-memory alloy material that is so that the lifting guide part 136 is capable of being restored to a circular shape after being expanded according to the temperature. That is, the shape-memory alloy refers to a metal that is restored to its original shape when a temperature decreases even if the metal is deformed by a high temperature because of remembering its original shape. The shape-memory alloy comprises a nickel-titanium alloy, a copper-zinc alloy, a gold-cadmium alloy, an indium-thallium alloy, and the like.

Since the lifting guide part 136 is made of the shape-memory alloy material, the secondary battery may quickly respond to a variation in temperature within the can to improve safety of the secondary battery.

Figure 4:
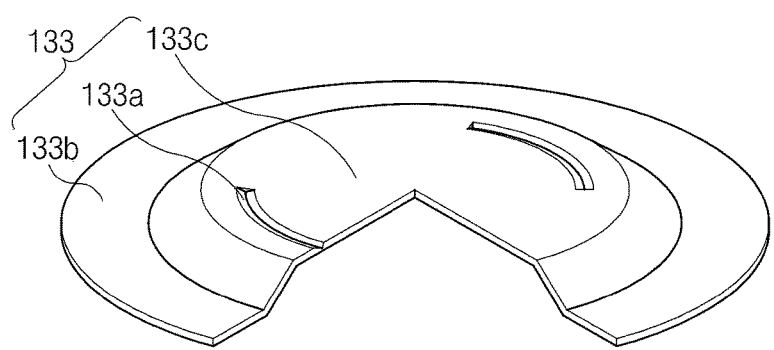
FIG. 4 is a perspective view illustrating another example of the safety vent according to the present invention.

As illustrated in FIG. 4, the cap assembly 130 may comprise at least two cut parts between at least the safety vent 133 and the down cap 134 if the cut part 133a is not formed in a strip shape due to the weakening of the safety vent 133. Thus, when a temperature within the can increases, at least two spots of the cut part provided in the safety vent 133 may be cut to quickly release the gas or the high-temperature heat in both directions.

Both end of the lifting guide part 136 are bonded to the safety vent 133 and the down cap 134, respectively. Thus, the lifting guide part may be prevented from moving between the safety vent 133 and the down cap 134 when the secondary battery moves. Particularly, when the lifting guide part 136 is expanded, an accurate position of the safety vent 133 may be lift to quickly cut the cut part 133a.

The cap assembly having the above-described configuration according to the present invention may comprise the lifting guide part 136 that is expanded by the high-temperature heat. Therefore, the cap assembly may be actively opened by the high-temperature heat and the gas pressure of the secondary battery without separate external control to quickly release the gas and the high-temperature heat within the can to the outside.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A cap assembly mounted on an opening of a can, the cap assembly comprising:
   a top cap;
   a safety element disposed below the top cap;
   a safety vent disposed on a lower portion of the safety element and having a cut part;
   a down cap disposed on a lower portion of the safety vent;
   a gasket surrounding edges of the top cap, the safety element, the safety vent, and the down cap and mounted on the opening of the can; and
   a lifting guide part disposed between the safety vent and the down cap to lift the safety vent while being expanded by a high-temperature gas transferred from the inside of the can and thereby to cut the cut part so that the high-temperature gas is released to the outside, the lifting guide part having a first end contacting the safety vent and a second end contacting the down cap, wherein a distance between the first end and second end increases with expansion of the lifting guide part to cut the cut part.

2. The cap assembly of claim 1, wherein the safety vent comprises a vent coupling part coupled to the gasket and a vent lifting part supported by the lifting guide part, and
   the vent coupling part and the vent lifting part are separated from each other when the cut part is cut.

3. The cap assembly of claim 2, wherein the vent lifting part is planar.

4. The cap assembly of claim 1, wherein the lifting guide part is made of a shape-memory alloy material that is restored in a circular shape after being expanded according to a temperature.

5. The cap assembly of claim 1, wherein at least two lifting guide parts are provided between the safety vent and the down cap to cut at least two spots of the cut part provided in the safety vent.

6. The cap assembly of claim 1, wherein the first end of the lifting guide part is bonded to the safety vent and the second end of the lifting guide part is bonded to the down cap.

* * * * *